(12) United States Patent
Ryo

(10) Patent No.: US 9,781,409 B2
(45) Date of Patent: Oct. 3, 2017

(54) PORTABLE TERMINAL DEVICE AND PROGRAM

(75) Inventor: Sho Ryo, Kawasaki (JP)

(73) Assignee: NEC CORPORATION, Tokyo (JP)

( * ) Notice: Subject to any disclaimer, the term of this patent is extended or adjusted under 35 U.S.C. 154(b) by 310 days.

(21) Appl. No.: 14/420,515

(22) PCT Filed: Aug. 17, 2012

(86) PCT No.: PCT/JP2012/005181
§ 371 (c)(1),
(2), (4) Date: Feb. 9, 2015

(87) PCT Pub. No.: WO2014/027381
PCT Pub. Date: Feb. 20, 2014

(65) Prior Publication Data
US 2015/0201187 A1    Jul. 16, 2015

(51) Int. Cl.
| H04N 11/02 | (2006.01) |
| H04N 7/12 | (2006.01) |
| H04N 11/04 | (2006.01) |
| H04N 13/04 | (2006.01) |
| G09G 5/00 | (2006.01) |

(Continued)

(52) U.S. Cl.
CPC ........... *H04N 13/0454* (2013.01); *G09G 5/00* (2013.01); *H04N 13/004* (2013.01); *H04N 13/0007* (2013.01); *H04N 13/007* (2013.01); *H04N 13/0059* (2013.01); *H04N 13/0066* (2013.01); *H04N 13/04* (2013.01); *H04N 13/0497* (2013.01); *H04N 21/41407* (2013.01); *H04N 21/4316* (2013.01); *H04N 21/4858* (2013.01); *H04N 21/4884* (2013.01);

(Continued)

(58) Field of Classification Search
None
See application file for complete search history.

(56) References Cited

U.S. PATENT DOCUMENTS

| 7,443,449 B2 | 10/2008 | Momosaki et al. |
| 8,212,922 B2 | 7/2012 | Momosaki et al. |

(Continued)

FOREIGN PATENT DOCUMENTS

| EP | 2448280 A2 | 5/2012 |
| EP | 2466449 A2 | 6/2012 |

(Continued)

OTHER PUBLICATIONS

Chinese Office Action for CN Application No. 201280075269 issued on Jan. 29, 2016 with English Translation.

(Continued)

*Primary Examiner* — Talha M Nawaz

(57) ABSTRACT

A 2D/3D conversion processing section converts 2D contents (television broadcast program) received by a television broadcast receiving section to contents for the right eye and contents for the left eye for 3D, and the contents for 3D obtained by conversion are subjected to 3D display on a display section. When switching is made from 2D display to 3D display, a central control section suppresses display of data-broadcast data regarding television video data. Consequently, even if video display of the television broadcast is switched from 2D to 3D, video of television broadcast can be displayed in 3D as effectively as possible.

6 Claims, 5 Drawing Sheets

(51) Int. Cl.
*H04N 21/414* (2011.01)
*H04N 21/431* (2011.01)
*H04N 21/81* (2011.01)
*H04N 13/00* (2006.01)
*H04N 21/485* (2011.01)
*H04N 21/488* (2011.01)

(52) U.S. Cl.
CPC ....... *H04N 21/816* (2013.01); *H04N 21/8126* (2013.01); *G09G 2340/0492* (2013.01); *H04N 13/0409* (2013.01)

(56) References Cited

U.S. PATENT DOCUMENTS

| | | | |
|---|---|---|---|
| 8,977,974 B2 | 3/2015 | Kraut | |
| 2004/0252979 A1* | 12/2004 | Momosaki | H04N 5/445 386/244 |
| 2008/0025698 A1 | 1/2008 | Momosaki et al. | |
| 2008/0027713 A1 | 1/2008 | Momosaki et al. | |
| 2008/0090658 A1* | 4/2008 | Kaji | A63F 13/08 463/31 |
| 2009/0040378 A1 | 2/2009 | Momosaki et al. | |
| 2010/0142924 A1* | 6/2010 | Yamashita | G11B 27/10 386/241 |
| 2010/0146445 A1 | 6/2010 | Kraut | |
| 2010/0150523 A1* | 6/2010 | Okubo | H04N 5/782 386/343 |
| 2010/0189413 A1 | 7/2010 | Yoshino | |
| 2010/0309202 A1* | 12/2010 | Watanabe | H04N 13/0497 345/419 |
| 2010/0323609 A1* | 12/2010 | Aramaki | H04N 13/0454 455/3.01 |
| 2011/0128351 A1* | 6/2011 | Newton | H04N 5/278 348/43 |
| 2011/0211815 A1* | 9/2011 | Yamashita | H04N 13/0029 386/353 |
| 2012/0050504 A1 | 3/2012 | Asano | |
| 2012/0050578 A1* | 3/2012 | Aoki | G03B 17/14 348/240.2 |
| 2012/0092335 A1* | 4/2012 | Kim | H04N 13/0029 345/419 |
| 2012/0154386 A1* | 6/2012 | Nagara | G02B 27/26 345/419 |
| 2012/0268559 A1* | 10/2012 | Watanabe | H04N 13/0456 348/43 |
| 2012/0300027 A1* | 11/2012 | Urisu | H04N 13/007 348/43 |
| 2015/0178040 A1 | 6/2015 | Kraut | |

FOREIGN PATENT DOCUMENTS

| | | |
|---|---|---|
| JP | 2006-094222 A | 4/2006 |
| JP | 2007-013561 A | 1/2007 |
| JP | 2010-164608 A | 7/2010 |
| JP | 2010-175643 A | 8/2010 |
| JP | 2012-049854 A | 3/2012 |
| JP | 2012-175318 A | 9/2012 |
| WO | 2012/060412 A1 | 5/2012 |

OTHER PUBLICATIONS

International Search Report for PCT Application No. PCT/JP2012/005181, mailed on Nov. 6, 2012.

The extended European Search Report of EP Application No. 12891362 dated on Feb. 26, 2016.

* cited by examiner (1)

(2)

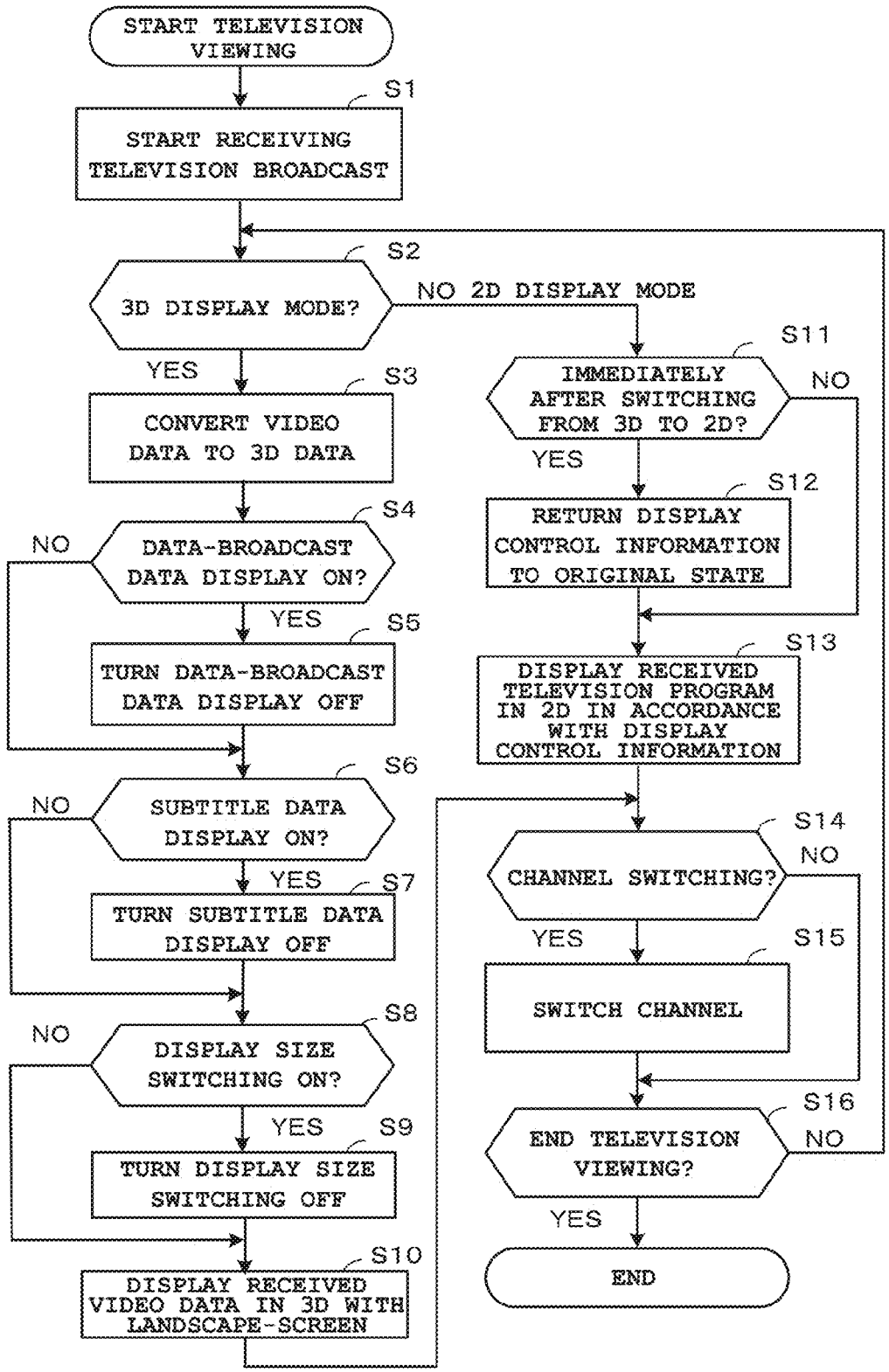

PORTABLE TERMINAL DEVICE AND PROGRAM

The present application is a National Stage Entry of PCT/JP2012/005181 filed Aug. 17, 2012, the disclosures of all of which are incorporated herein in their entirety by reference.

TECHNICAL FIELD

The present invention relates to a portable terminal device and program including a television receiving function of receiving data for data broadcasting and subtitle data multiplexed to a television broadcasting signal.

BACKGROUND ART

Conventionally, there have been various techniques for providing a user (viewer) with stereoscopic viewing by 3D (three-dimensional) display of images such as images (still images and moving images) on a flat display section. For example, there is a technique of providing a visual effect so that an object in a two-dimensional (2D) image is displayed in a stereoscopic manner. Note that a technique using polygons is one of these techniques. Also, there is a technique using binocular disparity between the right eye and the left eye of the viewer. That is, in this technique, an image for the right eye and an image for the left eye slightly misaligned with each other are provided, and an electronic parallax barrier (switching liquid crystal panel) for interrupting an optical route is arranged at an appropriate position so as to make the image for the right eye viewable by the right eye but not viewable by the left eye and the image for the left eye viewable by the left eye but not viewable by the right eye when these two images are simultaneously displayed. As a result, the images can be displayed as stereoscopic.

As this technique using a parallax barrier as described above, cellular phone apparatuses including a television function for 3D display of video data of television broadcast have been conventionally developed (refer to Patent Document 1).

PRIOR ART DOCUMENT

Patent Document

Patent Document 1: JP 2010-164608

SUMMARY OF INVENTION

Problem to be Solved by the Invention

Meanwhile, in a state where video data of television broadcast is subjected to 2D display, switching is temporarily made from 2D display to 3D display at timing when a favorite video is displayed, whereby a realistic and powerful television video can be enjoyed according to the user's preference.

However, on a terminal screen of a cellular phone apparatus or the like, even if the screen size is increased, realistic feeling and powerful feeling are limited compared with a large-scale television screen of a television receiver or the like. Moreover, 3D display of data-broadcast data and subtitle data multiplexed to a television broadcast signal makes the television video itself inconspicuous or the entire screen difficult to see, whereby realistic feeling and powerful feeling may be impaired.

An object of the present invention is to display video of television broadcast in 3D as effectively as possible even if video display of the television broadcast is switched from 2D to 3D.

Means for Solving the Problem

In order to solve the above-described problem, an aspect of the present invention provides a portable terminal device including a television receiving function of receiving data-broadcast data multiplexed to a television broadcast signal, the device comprising:
an extracting section which extracts video data and the data-broadcast data from the television broadcast signal received by the television receiving function;
a switching instructing section which makes an instruction for switching between 3D display and 2D display of the video data extracted by the extracting section; and
a display control section which suppresses display of the data-broadcast data extracted by the extracting section when an instruction for switching to the 3D display is provided from the switching instructing section.

In order to solve the above-described problem, another aspect of the present invention provides a non-transitory computer-readable storage medium having a program stored thereon that is executable by a computer of a portable terminal device to perform functions comprising:
a function of receiving data-broadcast data multiplexed to a television broadcast signal;
a function of extracting video data and the data-broadcast data from the received television broadcast signal;
a function of making an instruction for switching between 3D display and 2D display of the extracted video data; and
a function of suppressing display of the extracted data-broadcast data when an instruction for switching to the 3D display is provided.

Effect of the Invention

According to the present invention, even if video display of television broadcast is switched from 2D to 3D, television video can be conspicuous without impairing realistic feeling and powerful feeling by data-broadcast data, whereby video of television broadcast can be displayed in 3D as effectively as possible.

BRIEF DESCRIPTION OF DRAWINGS

FIG. 5 is a flowchart executed and started when an instruction for starting television viewing is provided.

DESCRIPTION OF EMBODIMENTS

An embodiment of the present invention will be described in detail below with reference to the drawings.

The embodiment of the present invention will be described with reference to FIG. 1 to FIG. 5.

Figure 1:
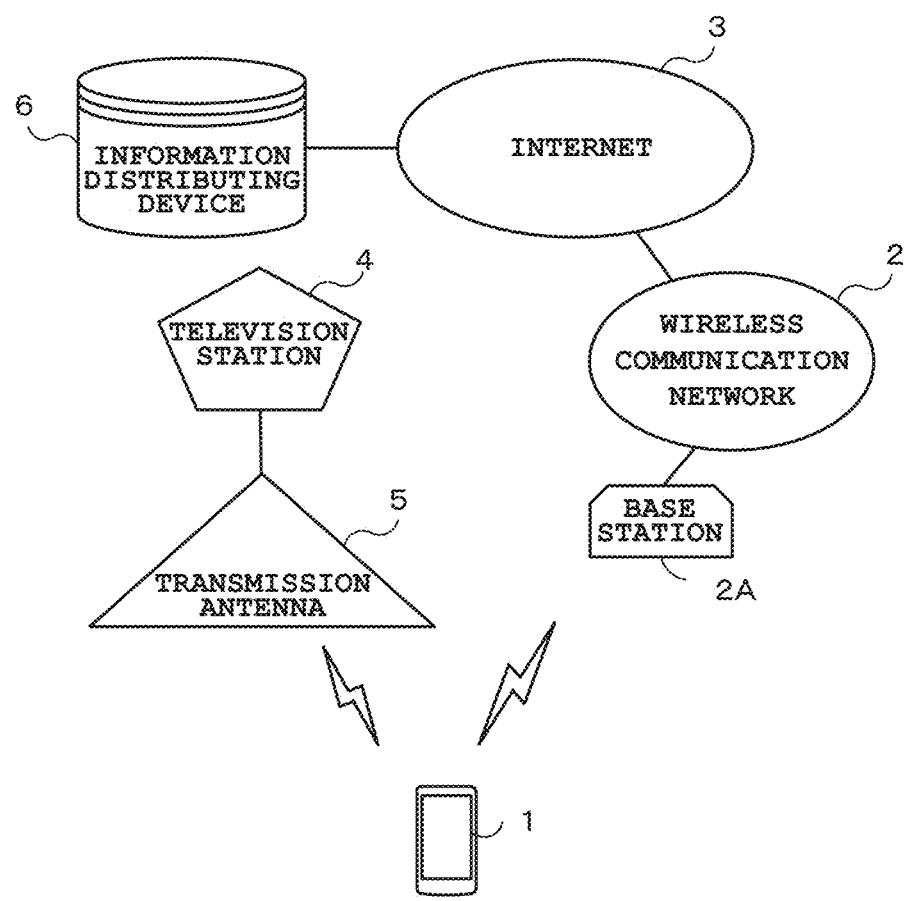
FIG. 1 is a block diagram depicting a communication network system that can be used by a cellular phone apparatus including a television broadcast receiving function applied as a portable terminal device.

This embodiment is exemplified by a case where the present invention is applied as a portable terminal device to a cellular phone apparatus including a television broadcast receiving function. FIG. 1 is a block diagram depicting a communication network system that can be used by this cellular phone apparatus.

The cellular phone apparatus 1 includes a calling function, an electronic mail function, and an Internet connecting function (Web access function) as well as a television broadcast receiving function capable of receiving digital television broadcast (for example, so-called one segment terrestrial digital television broadcasts), a 3D display function, and the like. In this 3D display function, 3D display of television video is performed by a parallax barrier scheme using binocular disparity between right and left eyes.

When a cellular phone apparatus 1 is connected to a wireless communication network 2 through a nearest base station 2A, the cellular phone apparatus 1 becomes in a state where a call can be performed with another cellular phone apparatus through this wireless communication network 2. Also, when the cellular phone apparatus 1 is connected to the Internet 3 through the wireless communication network 2, the cellular phone apparatus 1 can access and browse a website. And also, the cellular phone apparatus 1 receives the terrestrial digital television broadcast transmitted from a television station 4 through a transmission antenna 5, whereby terrestrial digital television broadcast can be viewed. Note that the television broadcast can be downloaded and received from an information distributing device 6 via the Internet 3, as in the case of Internet radio.

Figure 2:
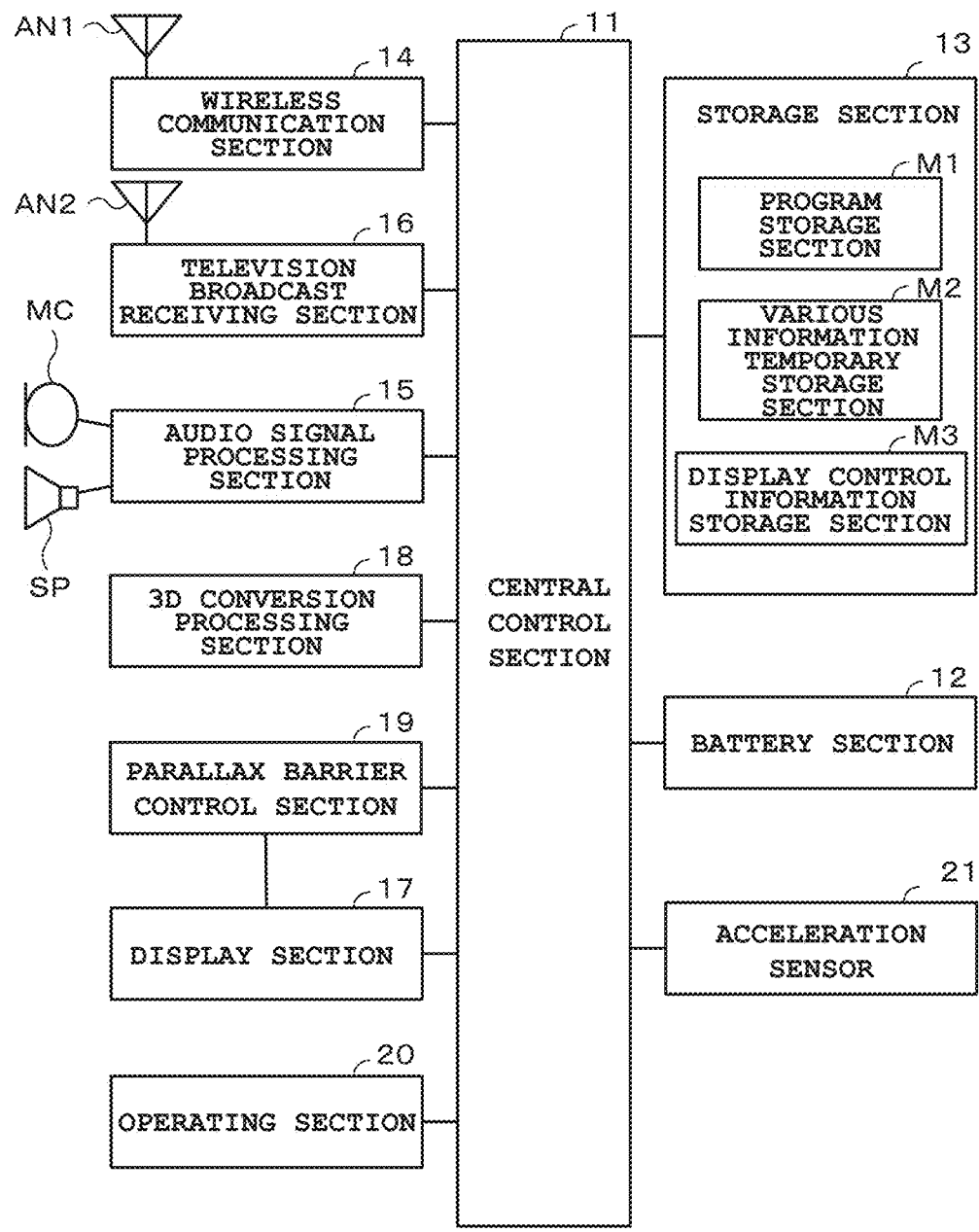
FIG. 2 is a block diagram depicting basic components of a cellular phone apparatus 1.

FIG. 2 is a block diagram depicting basic components of the cellular phone apparatus 1.

A central control section (CPU: Central Processing Unit) 11 operates by electric power supply from a battery section 12 including a secondary battery, and has a central processing section, a memory, and the like which control an entire operation of this cellular phone apparatus 1 in accordance with various programs in a storage section 13. This storage section 13 is provided with a program storage section M1 which stores programs and various applications that are used to realize the present embodiment in accordance with an operation procedure depicted in FIG. 5, and information that is required for the realization; a various information temporary storage section M2 which is used as a work area that temporarily stores various information required for the cellular phone apparatus 1 to operate; and a display control information storage section M3, which will be described further below, and the like. Note that the storage section 13 may include a removable portable memory (recording medium) such as, for example, a SD card or an IC card, and may include a storage device on a certain external server that is not illustrated.

A wireless communication section 14 includes a wireless section, a baseband section, a demultiplexing section, and the like, and, for example, transmits and receives data to and from the nearest base station 2A at the time of operation of the calling function, the electronic mail function, the Internet connecting function, or the like. At the time of operation of the calling function, the wireless communication section 14 takes in a signal from a reception side of the baseband section, demodulates the signal into a reception baseband signal, and then outputs audio from a call speaker SP through an audio signal processing section 15; and takes in input audio data from a call microphone MC thorough the audio signal processing section 15, encodes the audio data into a transmission baseband signal, then gives the encoded transmission baseband signal to a transmission side of the baseband section, and transmits and outputs the signal through an antenna AN1.

A television broadcast receiving section 16 can receive terrestrial digital television broadcast for communication terminal devices as well as program information such as data-broadcast data, subtitle data, electronic program guide (EPG), and the like. This television broadcast receiving section 16 has a receiving section (analog circuit section) which extracts a broadcast signal from an antenna AN2; and a digital circuit section which demodulates the received broadcast signal into OFDM (orthogonal frequency-division multiplex) signals, separates and extracts video, audio, data-broadcast data, and subtitle data from the multiplexed broadcast signal and decodes the extracted data, decompresses compressed data, and the like. The display section 17 uses a high-definition liquid crystal to show display information such as television video, and has a front surface provided with a liquid-crystal layer for generating a parallax barrier. The display section 17 has a screen with an uneven aspect ratio (for example, 6:4 [width to height]), and the CPU 11 performs control as to whether display information is displayed on a portrait screen or a landscape screen.

A 2D/3D conversion processing section 18 converts 2D contents (a television broadcast program) received by the television broadcast receiving section 16 to 3D contents for the right eye and 3D contents for the left eye. The contents obtained by conversion by the 3D conversion processing section 18 are subjected to 3D display on the display section 17. At the time of 3D display, in a state where display information for the right eye and display information for the left eye generated by the 3D conversion processing section 18 are simultaneously displayed on the display section 17, a parallax barrier control section 19 generates a parallax barrier in a front layer of the display section 17 so as to allow the contents to be correctly viewed in 3D.

Figure 3:
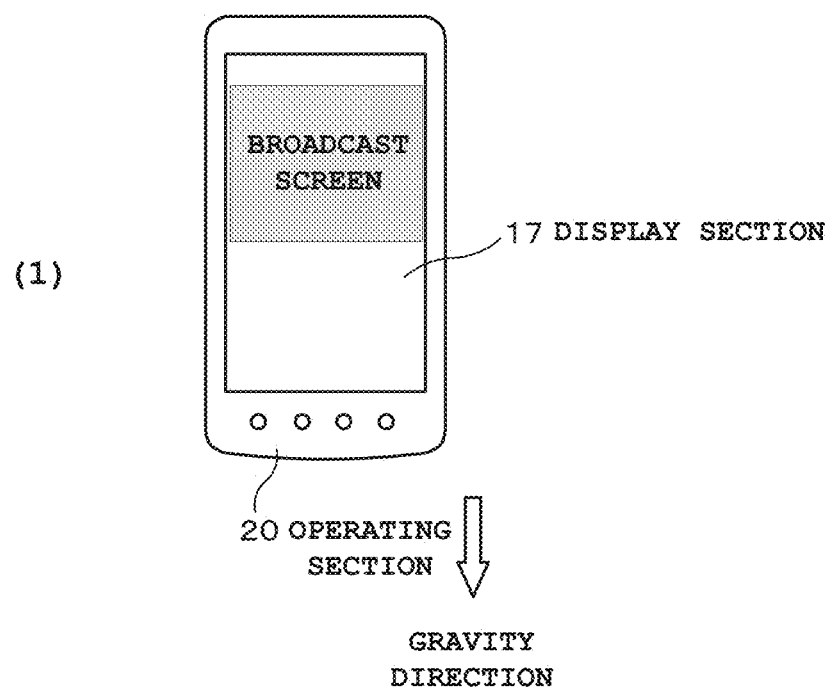
FIG. 3(1) is a drawing which depicts a portrait screen when the screen of a display section 17 is in a portrait orientation, and FIG. 3(2) is a drawing which depicts a landscape screen when the screen thereof is in a landscape orientation.
Figure 3:
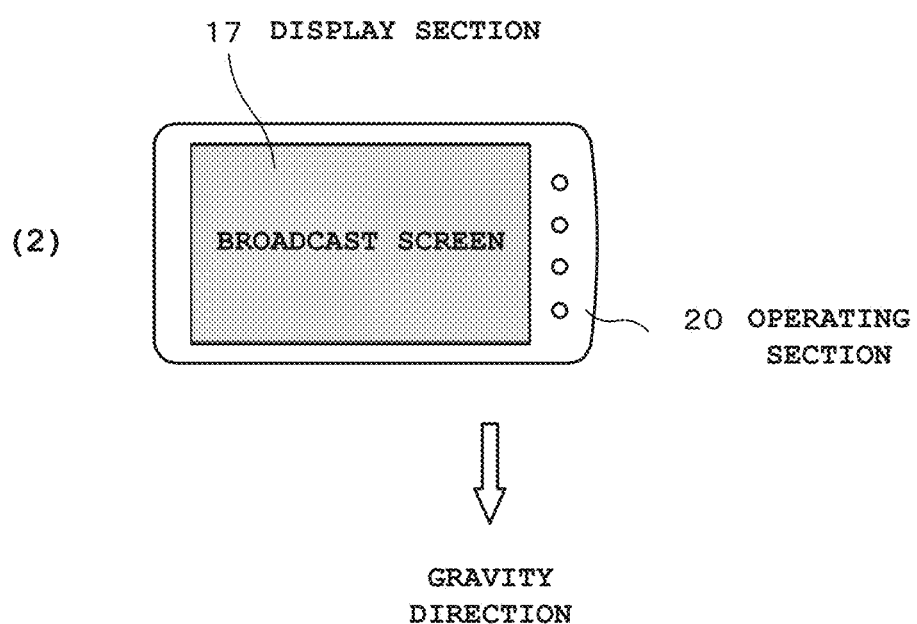

An operating section 20 is used to perform dial-input, text-input, command-input, etc. The central control section 11 performs processing based on input operation signals from this operating section 20. An acceleration sensor 21 is used to detect the orientation of the screen of the display section 17, and is structured of, for example, a three-axis-type acceleration sensor. As depicted in FIG. 3, the acceleration sensor 21 detects whether the screen of the display section 17 with respect to the gravity direction is in a portrait orientation (a portrait screen as depicted in FIG. 3(1)) or in a landscape orientation (a landscape screen as depicted in FIG. 3(2)). The central control section 11 controls a display size switching function of changing a display size (a size corresponding to the portrait screen/a size corresponding to the landscape screen) of television video in accordance with the orientation of the screen detected by the acceleration sensor 21. In this case, when a broadcast screen is displayed on the display section 17, this display size switching function makes the size of the television screen (broadcast screen) into a partial area size (a size corresponding to the portrait screen) of the display section 17 when the display section 17 is in a portrait orientation as depicted in FIG. 3(1) and into an entire area size (a size corresponding to the landscape screen) of the display section 17 when in a landscape orientation as depicted in FIG. 3(2).

Figure 4:
FIG. 4 is a diagram for explaining a display control information storage section M3.

FIG. 4 is a diagram for explaining the display control information storage section M3.

The display control information storage section M3 stores various information regarding display control, and is configured to have "item" and "setting flag". "Item" indicates the types of display control information which are "2D/3D display mode switching function", "display ON/OFF function for data-broadcast data", "display ON/OFF function for subtitle data", "display size switching function", etc. "Setting flag" corresponding to this "item" indicates the state of a corresponding function, and any setting flag can be set by user operation.

When "setting flag" corresponding to "2D/3D display mode switching function" is "1", a 2D display mode is set, indicating that the television video is to be subjected to 2D display. When that "setting flag" is "0", a 3D display mode is set, indicating that the television video is to be subjected to 3D display. When "setting flag" corresponding to "display ON/OFF function for data-broadcast data" is "1", a data-broadcast ON state is set, indicating that the data-broadcast data is to be displayed together with the television video. When that "setting flag" is "0", a data broadcast OFF state is set, indicating that the data-broadcast data is not to be displayed.

When "setting flag" corresponding to "display ON/OFF function for subtitle data" is "1", a subtitle ON state is set, indicating that subtitle data multiplexed to the television broadcast signal is to be displayed together with the television video. When that "setting flag" is "0", a subtitle OFF state is set, indicating that subtitle data is not to be displayed. When that "setting flag" corresponding to "display size switching function" is "1", the display size switching function is set to be turned ON, indicating that the display size of the display information such as the television video is changed in accordance with the orientation of the screen detected by the acceleration sensor 21. When that "setting flag" is "0", the display size switching function is set to be turned OFF. Note that, when the display size switching function is set to be in an "OFF" state, the display information such as the television video is displayed in the size corresponding to the landscape screen depicted in FIG. 3(2), regardless of the orientation of the screen detected by the acceleration sensor 21.

Next, an operation concept of the cellular phone apparatus 1 according to the present embodiment is described below with reference to a flowchart depicted in FIG. 5. Here, each function described in this flowchart is stored in a readable program code format, and operations are sequentially executed in accordance with the program codes.

FIG. 5 is a flowchart executed and started when an instruction for starting television viewing is provided. That is, if a menu item for starting television has been selected from a menu screen or if a viewing time set in advance has come, it is assumed that an instruction for starting television viewing is provided, and operations following the flow of FIG. 5 are executed and started.

First, after starting an operation of starting the television broadcast receiving section 16 to receive a television broadcast signal (Step S1), the central control section 11 refers to "2D/3D display mode" of the display control information storage section M3 to check whether its corresponding "setting flag" is "0", that is, whether "3D display mode" is selected (Step S2).

Here, when "setting flag" corresponding to "2D/3D display mode switching function" is "1", that is, when the 2D display mode is selected (NO at Step S2), the process proceeds to Step S11, and the central control section 11 checks whether now is the time immediately after switching from the 3D display mode to the 2D display mode. When now is not the time immediately after switching (NO at Step S11), the contents of the received television program are subjected to 2D display on the display section 17 in accordance with the details of the display control information storage section M3 (Step S13). Here, as depicted in FIG. 4, when "setting flags" corresponding to "display ON/OFF function for data-broadcast data", "display ON/OFF function for subtitle data", and "display size switching function" within the display control information storage section M3 are all "1", the data-broadcast data and the subtitle data are subjected to 2D display together with the television video, and are subjected to 2D display with the size corresponding to the portrait screen (refer to FIG. 3(1)) or the size corresponding to the landscape screen (refer to FIG. 3(2)) in accordance with the orientation of the screen detected by the acceleration sensor 21.

Then, the central control section 11 checks whether a channel switching operation has been performed (Step S14) and whether television viewing has ended (Step S16). Here, if a channel switching operation has been performed (YES at Step S14), a channel switching process is performed (Step S15). If a user operation for making an instruction for ending television viewing has been performed or it is detected that the end time of the program being viewed has come (YES at Step S16), the flow of FIG. 5 ends. Also, if a switching operation and an end operation are not performed (NO at Steps S14 and S16), the process returns to the above-described Step S14 of judging "2D/3D display mode switching function", and the above-described operation is repeated in the drawing.

Here, when "setting flag" corresponding to "2D/3D display mode switching function" is "0", that is, when the 3D display mode is selected, or when switching is made from "2D display mode" to "3D display mode" (YES at Step S2), the 2D/3D conversion processing section 18 is operated to convert the television video to contents for the right eye and contents for the left eye as 3D video (3D contents) (Step S3). Then, with reference to the display control information storage section M3, the central control section 11 checks whether "setting flag" corresponding to "display ON/OFF function for data-broadcast data" is "1", that is, whether the display ON/OFF function for data-broadcast data is a data broadcast ON state, indicating that the data-broadcast data is to be displayed together with the television video (Step S4). When the display ON/OFF function for data-broadcast data is a data broadcast ON state (YES at Step S4), the "setting flag" is set at "0" to change to a data broadcast OFF state (Step S5).

Similarly, with reference to the display control information storage section M3, the central control section 11 checks whether "setting flag" corresponding to "display ON/OFF function for subtitle data" is "1", that is, whether the display ON/OFF function for subtitle data is a subtitle ON state, indicating that the subtitle data is to be displayed together with the television video (Step S6). When the display ON/OFF function for subtitle data is a subtitle ON state (YES at Step S6), the "setting flag" is set at "0" to change to a subtitle OFF state (Step S7). Furthermore, the central control section 11 checks whether "setting flag" corresponding to "display size switching function" is "1", that is, whether the display size switching function is in an ON state, indicating that the display size of the display information such as the television video is to be changed in accordance with the orientation of the screen detected by the acceleration sensor 21 (Step S8). When the display size switching function is in an ON state (YES at Step S8), the "setting flag" is set at "0" to change the display size switching function to an OFF state (Step S9).

Then, the contents of the received television video are subjected to 3D display on the display section 17 in accordance with the details of the display control information storage section M3 (Step S10). In this case, since "setting flags" corresponding to "display ON/OFF function for data-broadcast data", "display ON/OFF function for subtitle data", and "display size switching function" within the display control information storage section M3 are all "0", only the television video is subjected to 3D display, with the data-broadcast data and the subtitle data not displayed, and is subjected to 3D display with the size corresponding to the landscape screen (refer to FIG. 3(2)), regardless of the orientation of the screen detected by the acceleration sensor 21. Then, as with the case described above, the central control section 11 checks whether a channel switching operation has been performed (Step S14) and whether television viewing has ended (Step S16).

As described above, the present embodiment suppresses display of the data-broadcast data regarding the television video data when switching is made from 2D display to 3D display. As a result, even if video display of television broadcast is switched from 2D to 3D, television video can be conspicuous without impairing realistic feeling or powerful feeling by the data-broadcast data, for example. Accordingly, the video of the television broadcast can be displayed in 3D as effectively as possible. This is advantageous for the portable terminal with a limited screen size.

When switching is made from 2D display to 3D display, the display setting of the data-broadcast data is turned OFF. Accordingly, the display ON/OFF function for data-broadcast data can be operated in conjunction with the switching function, whereby operability can be improved.

When switching is made from 2D display to 3D display, display of the data-broadcast data is suppressed, and also the display size switching function is suspended and the video data is displayed with the landscape-screen size. Accordingly, at the time of 3D display, the display can be fixed to a display where the entire screen is effectively used.

When switching is made from 2D display to 3D display, display of the subtitle data regarding the television video data is suppressed. As a result, even if video display of television broadcast is switched from 2D to 3D, television video can be conspicuous without impairing realistic feeling or powerful feeling by the subtitle data, for example. Accordingly, the video of the television broadcast can be displayed in 3D as effectively as possible. This is advantageous for the portable terminal with a limited screen size.

When switching is made from 2D display to 3D display, the display setting of the subtitle data is turned OFF. Accordingly, the display ON/OFF function for subtitle data can be operated in conjunction with the switching function, whereby operability can be improved.

When switching is made from 2D display to 3D display, display of the subtitle data is suppressed, and also the display size switching function is suspended and the video data is displayed with the landscape-screen size. Accordingly, at the time of 3D display, the display can be fixed to a display where the entire screen is effectively used.

In the above-described embodiment, when display of the data-broadcast data and the subtitle data is suppressed in response to switching from 2D display to 3D display, only the video data is displayed, with the data-broadcast data and the subtitle data not displayed. However, the present invention is not limited to the case where the data-broadcast data and the subtitle data are not displayed. For example, the data-broadcast data and the subtitle data may be displayed in a translucent state, may be displayed at a corner of the screen with a small character size, or may be collectively displayed later, with video display timing being shifted.

In the above-described embodiment, the 2D/3D conversion processing section 18 is provided to covert 2D contents (television broadcast) to contents for the right eye and contents for the left eye for 3D. This can be similarly applied to the case where the television broadcast receiving section 16 receives contents for 3D.

In the above-described embodiment, the present invention is applied to a cellular phone apparatus as a portable terminal device. The present invention can be applied to a digital camera (compact camera), a PDA (personal, portable information communication equipment), a music player, or the like including a television broadcast receiving function.

In addition, the "devices" or the "sections" described in the above-described embodiment are not required to be in a single housing and may be separated into a plurality of housings by function. Furthermore, the steps in the above-described flowchart are not required to be processed in time-series, and may be processed in parallel, or individually and independently.

Hereinafter, several embodiments the present invention are summarized in the Supplementary Notes described below.

(Supplementary Note 1)

A portable terminal device including a television receiving function of receiving data-broadcast data multiplexed to a television broadcast signal, the device comprising:

an extracting section which extracts video data and the data-broadcast data from the television broadcast signal received by the television receiving function;

a switching instructing section which makes an instruction for switching between 3D display and 2D display of the video data extracted by the extracting section; and a display control section which suppresses display of the data-broadcast data extracted by the extracting section when an instruction for switching to the 3D display is provided from the switching instructing section.

According to Supplementary Note 1, even if video display of television broadcast is switched from 2D to 3D, television video can be conspicuous without impairing realistic feeling or powerful feeling by the data-broadcast data, for example. Accordingly, the video of the television broadcast can be displayed in 3D as effectively as possible. This is advantageous for the portable terminal with a limited screen size.

(Supplementary Note 2)

The portable terminal device according to Supplementary Note 1, further comprising a data-broadcast display setting section which arbitrarily sets ON or OFF of display setting of data broadcast indicating whether to display the data-broadcast data, wherein the display control section suppresses the display of the data-broadcast data by switching to OFF setting when ON setting for displaying the data-broadcast data is provided by the data-broadcast display setting section.

According to Supplementary Note 2, the function of turning the display of the for data-broadcast data ON/OFF can be operated in conjunction with the function of switching the video display of the television broadcast from 2D to 3D, whereby operability can be improved.

(Supplementary Note 3)

The portable terminal device according to Supplementary Note 1, further comprising:

a detecting section which detects whether a display section with an uneven aspect ratio is in a portrait orientation or a landscape orientation with respect to a gravity direction; and a display size switching section which displays the video data with a portrait screen size on the display section when the portrait orientation is detected by the detecting section and displays the video data with a landscape screen size on the display section when the landscape orientation is detected, wherein the display control section suppresses the display of the data-broadcast data extracted by the extracting section, and also suspends a function of the display size switching section and displays the video data with the landscape screen size.

According to Supplementary Note 3, the display size switching function is suspended and the video data is displayed with the landscape-screen size. Accordingly, at the time of 3D display, the display can be fixed to a display where the entire screen is effectively used.

(Supplementary Note 4)

A portable terminal device including a television receiving function of receiving subtitle data multiplexed to a television broadcast signal, the device comprising:

an extracting section which extracts video data and the subtitle data from the television broadcast signal received by the television receiving function;

a switching instructing section which makes an instruction for switching between 3D display and 2D display of the video data extracted by the extracting section; and a display control section which suppresses display of the subtitle data extracted by the extracting section when an instruction for switching to the 3D display is provided from the switching instructing section.

According to Supplementary Note 4, even if video display of television broadcast is switched from 2D to 3D, television video can be conspicuous without impairing realistic feeling or powerful feeling by the subtitle data, for example. Accordingly, the video of the television broadcast can be displayed in 3D as effectively as possible. This is advantageous for the portable terminal with a limited screen size.

(Supplementary Note 5)

The portable terminal device according to Supplementary Note 4, further comprising a subtitle display setting section which arbitrarily sets ON or OFF of display setting of the subtitle indicating whether to display the subtitle data, wherein the display control section suppresses the display of the subtitle data by switching to OFF setting when ON setting for displaying the subtitle data is provided by the subtitle display setting section.

According to Supplementary Note 5, the function of turning the display of the subtitle data ON/OFF can be operated in conjunction with the function of switching the video display of the television broadcast from 2D to 3D, whereby operability can be improved.

(Supplementary Note 6)

The portable terminal device according to Supplementary Note 4, further comprising:

a detecting section which detects whether a display section with an uneven aspect ratio is in a portrait orientation or a landscape orientation with respect to a gravity direction; and display size switching section which displays the video data with a portrait screen size on the display section when the portrait orientation is detected by the detecting section and displays the video data with a landscape screen size on the display section when the landscape orientation is detected, wherein the display control section suppresses the display of the subtitle data extracted by the extracting section, and also suspends a function of the display size switching section and displays the video data with the landscape screen size.

According to Supplementary Note 6, when switching is made from 2D display to 3D display, display of the subtitle data is suppressed, and also the display size switching function is suspended and the video data is displayed with the landscape-screen size. Accordingly, at the time of 3D display, the display can be fixed to a display where the entire screen is effectively used.

(Supplementary Note 7)

A non-transitory computer-readable storage medium having a program stored thereon that is executable by a computer of a portable terminal device to perform functions comprising:

a function of receiving data-broadcast data multiplexed to a television broadcast signal;

a function of extracting video data and the data-broadcast data from the received television broadcast signal;

a function of making an instruction for switching between 3D display and 2D display of the extracted video data; and a function of suppressing display of the extracted data-broadcast data when an instruction for switching to the 3D display is provided.

According to Supplementary Note 7, the functions in Supplementary Note 1 can be provided in the form of software (program).

(Supplementary Note 8)

A non-transitory computer-readable storage medium having a program stored thereon that is executable by a computer of a portable terminal device to perform functions comprising:

a function of receiving subtitle data multiplexed to a television broadcast signal;

a function of extracting video data and the subtitle data from the received television broadcast signal;

a function of making an instruction for switching between 3D display and 2D display of the extracted video data; and a function of suppressing display of the extracted subtitle data when an instruction for switching to the 3D display is provided.

According to Supplementary Note 8, the functions in Supplementary Note 4 can be provided in the form of software (program).

DESCRIPTION OF REFERENCE NUMERALS 1 cellular phone apparatus
11 central control section
13 storage section
16 television broadcast receiving section
17 display section
18 2D/3D conversion processing section
19 parallax barrier control section
20 operating section
21 acceleration sensor
M1 program storage section
M2 various information temporary storage section
M3 display control information storage section

What is claimed is:

1. A portable terminal device including a television receiving function of receiving data-broadcast data multiplexed to a television broadcast signal, the device comprising:
at least one hardware processor comprising:
an extracting section which extracts video data and the data-broadcast data from the television broadcast signal received by the television receiving function;
a switching instructing section which makes an instruction for switching between 3D display and 2D display of the video data extracted by the extracting section;
a detecting section which detects whether a display section with an uneven aspect ratio is in a portrait orientation or a landscape orientation with respect to a gravity direction; and
a display control section which, in a state where an instruction for switching to the 2D display has been provided from the switching instructing section, displays the video data and the data-broadcast data extracted by the extracting section, with a portrait screen size or with a landscape screen size in accordance with an orientation of the display section detected by the detecting section, and in a state where an instruction for switching to the 3D display has been provided from the switching instructing section, suppresses display of the data-broadcast data extracted by the extracting section and displays the video data extracted by the extracting section, with a landscape screen size, regardless of the orientation of the display section detected by the detecting section.

2. The portable terminal device according to claim 1, wherein the at least one hardware processor further comprising a data-broadcast display setting section which arbitrarily sets ON or OFF of display setting of data broadcast indicating whether to display the data-broadcast data,
wherein, in a state where an instruction for switching to the 2D display has been provided from the switching instructing section, and when ON setting for displaying the data-broadcast data is provided by the data-broadcast display setting section, the display control section suppresses the display of the data-broadcast data by switching to OFF setting.

3. A portable terminal device including a television receiving function of receiving subtitle data multiplexed to a television broadcast signal, the device comprising:
at least one hardware processor comprising:
an extracting section which extracts video data and the subtitle data from the television broadcast signal received by the television receiving function;
a switching instructing section which makes an instruction for switching between 3D display and 2D display of the video data extracted by the extracting section;
a detecting section which detects whether a display section with an uneven aspect ratio is in a portrait orientation or a landscape orientation with respect to a gravity direction; and
a display control section which, in a state where an instruction for switching to the 2D display has been provided from the switching instructing section, displays the video data and the subtitle data extracted by the extracting section, with a portrait screen size or with a landscape screen size in accordance with an orientation of the display section detected by the detecting section, and in a state where an instruction for switching to the 3D display has been provided from the switching instructing section, suppresses display of the subtitle data extracted by the extracting section and displays the video data extracted by the extracting section, with a landscape screen size, regardless of the orientation of the display section detected by the detecting section.

4. The portable terminal device according to claim 3, wherein the at least one hardware processor further comprising a subtitle display setting section which arbitrarily sets ON or OFF of display setting of the subtitle indicating whether to display the subtitle data,
wherein, in a state where an instruction for switching to the 2D display has been provided from the switching instructing section, and when ON setting for displaying the subtitle data is provided by the subtitle display setting section, the display control section suppresses the display of the subtitle data by switching to OFF setting.

5. A non-transitory computer-readable storage medium having a program stored thereon that is executable by a computer of a portable terminal device to perform functions comprising:
a function of receiving data-broadcast data multiplexed to a television broadcast signal;
a function of extracting video data and the data-broadcast data from the received television broadcast signal;
a function of making an instruction for switching between 3D display and 2D display of the extracted video data;
a function of detecting whether a display section with an uneven aspect ratio is in a portrait orientation or a landscape orientation with respect to a gravity direction; and a function of, in a state where an instruction for switching to the 2D display has been provided, displaying the extracted video data and the extracted data-broadcast data, with a portrait screen size or with a landscape screen size in accordance with a detected orientation, and in a state where an instruction for switching to the 3D display has been provided, suppressing display of the extracted data-broadcast data and displaying the extracted video data, with a landscape screen size, regardless of the detected orientation of the display section.

6. A non-transitory computer-readable storage medium having a program stored thereon that is executable by a computer of a portable terminal device to perform functions comprising:
a function of receiving subtitle data multiplexed to a television broadcast signal;
a function of extracting video data and the subtitle data from the received television broadcast signal;
a function of making an instruction for switching between 3D display and 2D display of the extracted video data;
a function of detecting whether a display section with an uneven aspect ratio is in a portrait orientation or a landscape orientation with respect to a gravity direction; and
a function of, in a state where an instruction for switching to the 2D display has been provided, displaying the extracted video data and the extracted subtitle data, with a portrait screen size or with a landscape screen size in accordance with a detected orientation of the display section, and in a state where an instruction for switching to the 3D display has been provided, suppressing display of the extracted subtitle data and displaying the extracted video data, with a landscape screen size, regardless of the detected orientation of the display section when an instruction for switching to the 3D display is provided.

\* \* \* \* \*